Feb. 12, 1924.

C. H. CROCKETT 1,483,214

VEHICLE SPRING

Original Filed Dec. 1, 1916    4 Sheets-Sheet 1

Inventor
Charles H. Crockett

By Frank C. Curtis
Attorney

Feb. 12, 1924.
C. H. CROCKETT
VEHICLE SPRING
Original Filed Dec. 1, 1916    4 Sheets-Sheet 2
1,483,214
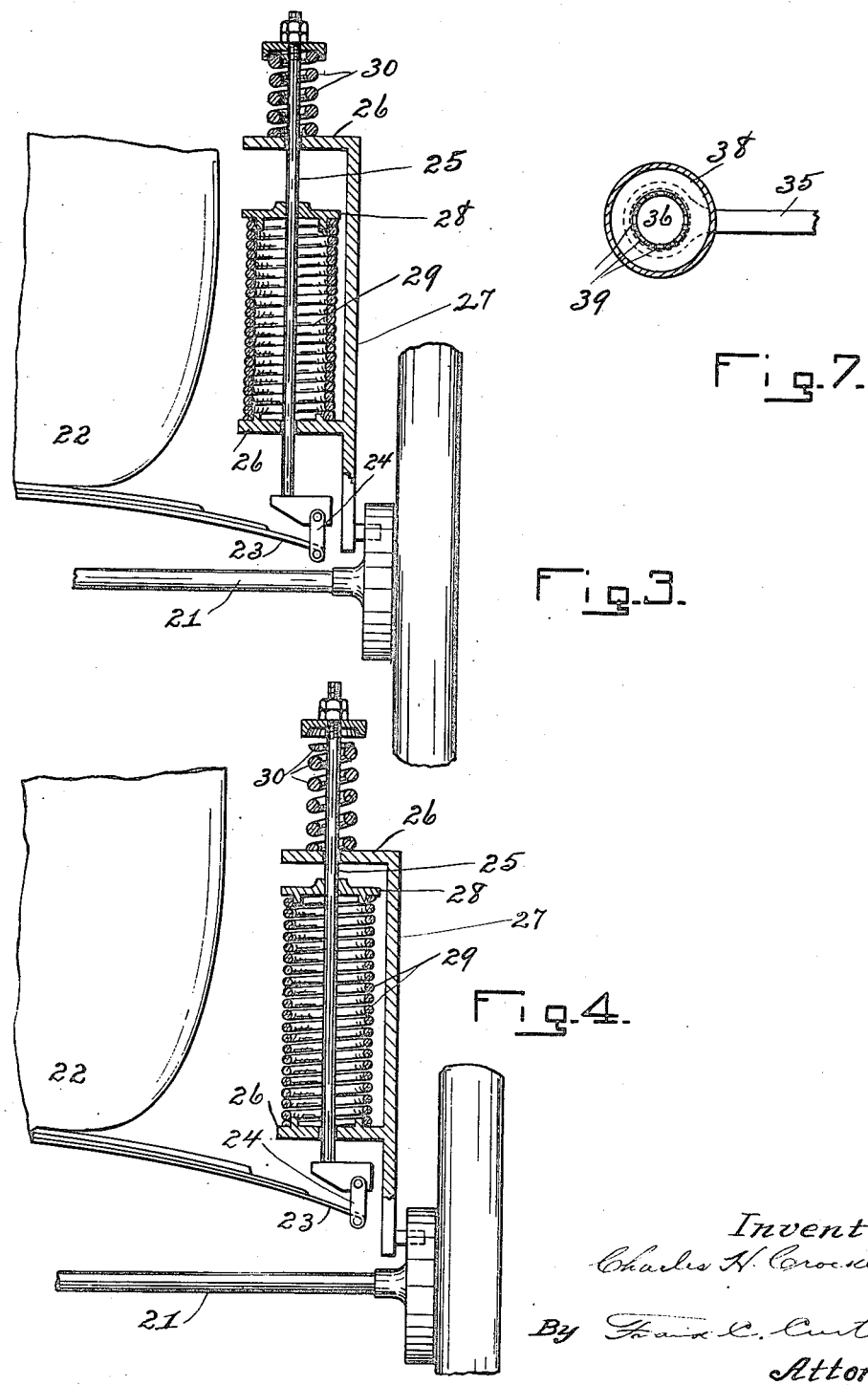

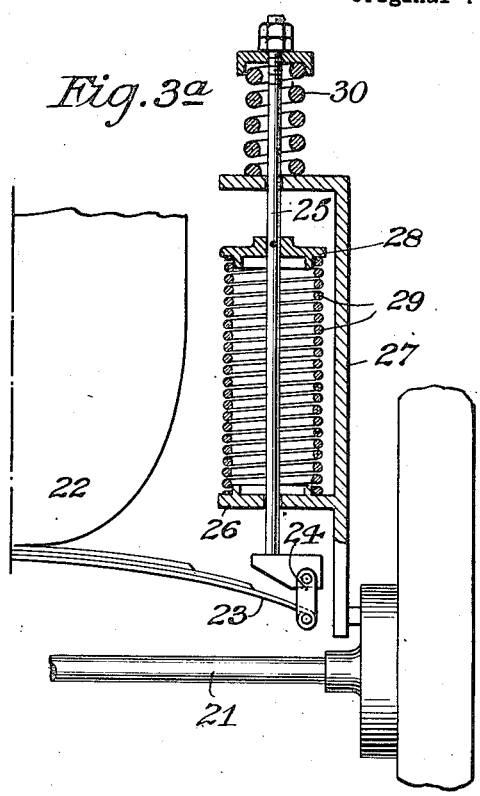
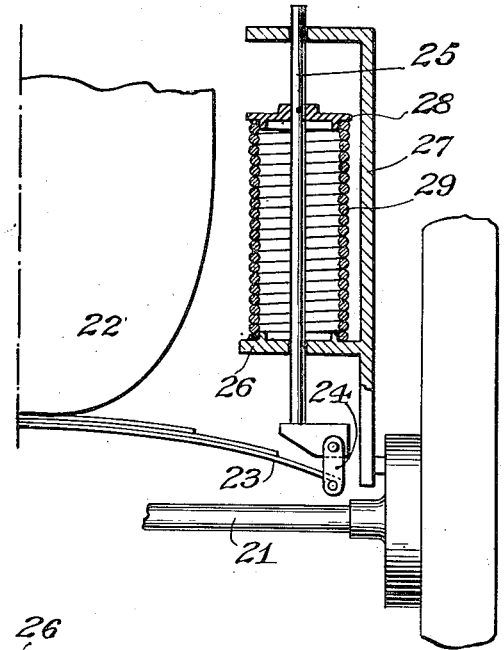
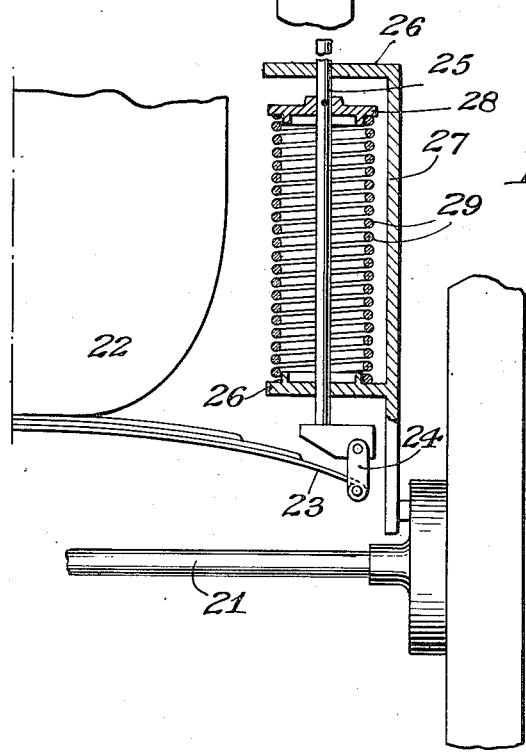

Patented Feb. 12, 1924.

1,483,214

UNITED STATES PATENT OFFICE.

CHARLES H. CROCKETT, OF TROY, NEW YORK.

VEHICLE SPRING.

Application filed December 1, 1916, Serial No. 134,255. Renewed June 16, 1922. Serial No. 568,820.

*To all whom it may concern:*

Be it known that I, CHARLES H. CROCKETT, a citizen of the United States, residing at Troy, county of Rensselaer, and State of New York, have invented certain new and useful Improvements in Vehicle Springs, of which the following is a specification.

Reference may be had to the accompanying drawings, and the reference characters marked thereon, which form a part of this specification. Similar characters refer to similar parts in the several figures therein.

The invention relates to elastic means for supporting the body upon the axle of a road-vehicle, or the like.

The principal object of the invention is to prevent ordinary road-depressions from causing the body of the vehicle to vary greatly from a continuous path at a substantially uniform distance from the general surface of the roadway, which path is that which the body of the vehicle should traverse for most comfortable riding.

In carrying out the invention, I support the body of the vehicle upon the axle by means of a main-spring, and an auxiliary-spring having a relatively high deflection-load-ratio both resiliently resistant to loads up to normal, with provision for preventing a substantial increase by an over-load in the spring-force of the auxiliary-spring above that due to a predetermined normal load. Each of the springs may be a single spring-element or it may be made up of a plurality of spring-elements; and various kinds of springs may be employed, such as metal-springs, air-springs, etc., in carrying out my invention.

Other objects will appear in connection with the following description:

Fig. 1 of the drawings is a diagrammatic view representing in side elevation the rear portion of a vehicle provided with spring-mechanism embodying one form of my invention, with the respective parts in the positions which they assume relatively to the axle under normal load.

Fig. 3 is a diagrammatic view in rear elevation of a portion of a vehicle provided with spring-mechanism embodying another form of my invention, with the respective parts in the positions which they assume relatively to the axle under maximum load.

Fig. 3ª is a view similar to Fig. 3 with the respective parts in the positions which they assume relatively to the axle under normal load.

Fig. 4 is a similar view showing the respective parts in the positions which they assume relatively to the axle under less than normal load.

Fig. 4ª is a diagrammatic view in rear elevation of a portion of a vehicle provided with spring mechanism embodying another form of my invention with the respective parts in the positions which they assume relatively to the axle under normal load.

Fig. 4ᵇ is a view similar to Fig. 4ª with the respective parts in the positions which they assume relatively to the axle under less than normal load.

Figure 5:
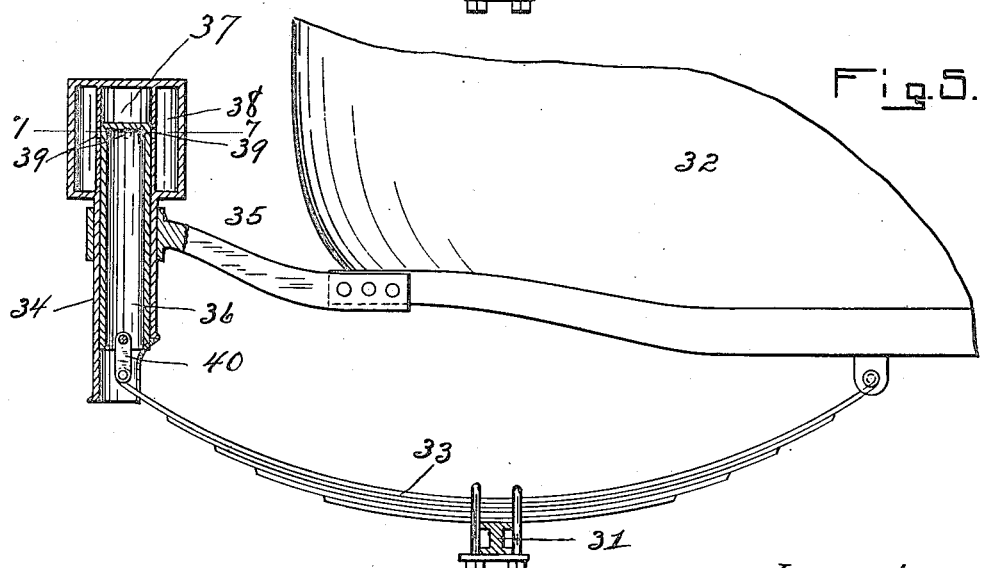

Fig. 5 is a diagrammatic view representing in side elevation the rear portion of a vehicle provided with spring-mechanism embodying another form of my invention in which air-springs are employed for certain of the spring-elements, the respective parts being shown in the positions which they assume relatively to the axle under normal load.

Figure 6:
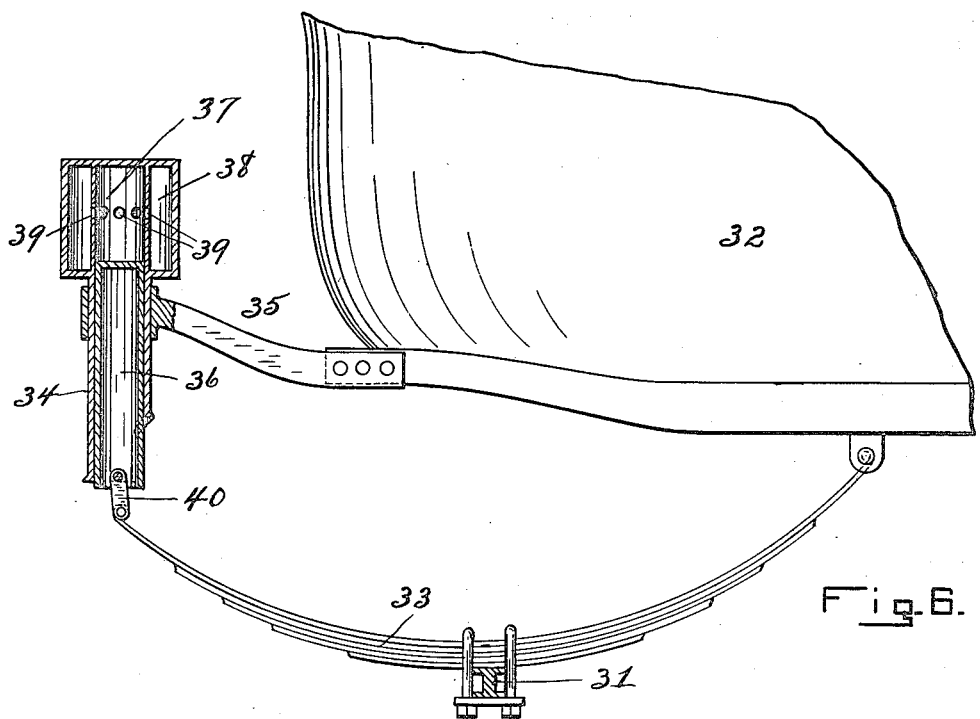

Fig. 6 is a similar view showing the respective parts in the positions which they assume relatively to the axle under less than normal load.

Fig. 7 is a horizontal section taken on the broken line 7—7 in Fig. 5.

Figure 1:
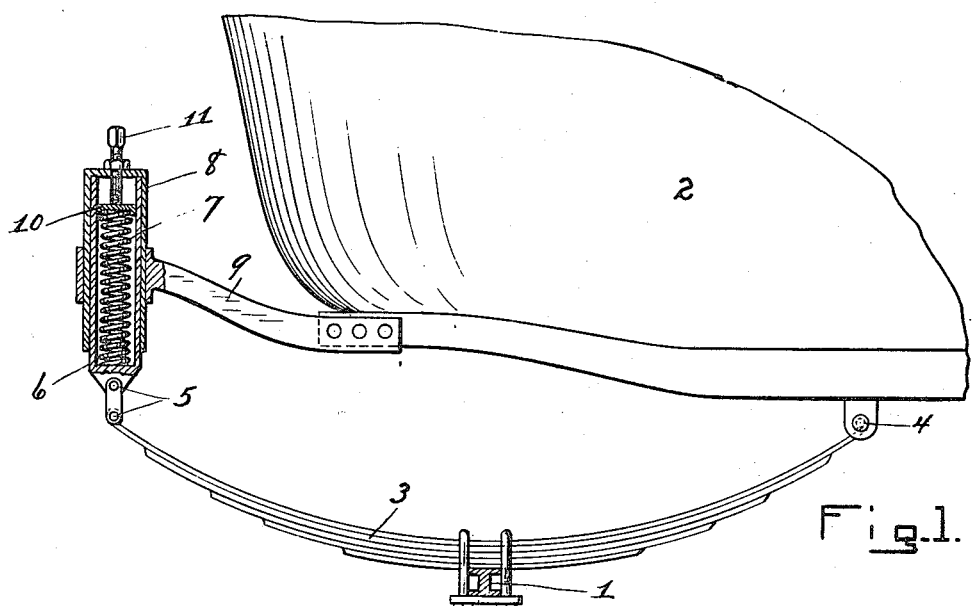
Figure 2:
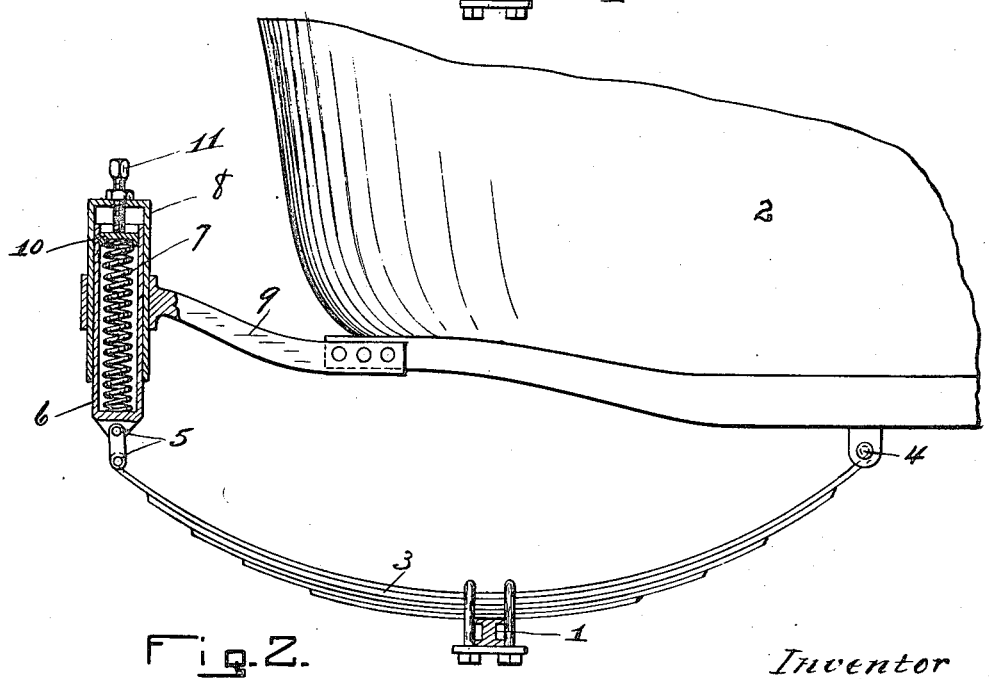
Fig. 2 is a similar view showing the respective parts in the positions which they assume relatively to the axle under less than normal load.

Referring to the construction shown in Figs. 1 and 2 of the drawings, 1, is the axle and 2, the body of an ordinary road-vehicle such as an automobile.

A semi-elliptic spring 3, is mounted upon the axle in the usual manner with one of its ends connected at 4, to the body 2.

The other end of this semi-elliptic spring 3, is shackled at 5, to the lower end of a cylinder 6, which contains a helical compression-spring 7.

The cylinder 6, the upper end of which is open, is adapted to play telescopically within an outer cylinder 8, fixed upon a bracket 9, projecting from the body 2, of the vehicle.

The upper end of the outer cylinder 8, is closed, while its lower end is open to receive the inner cylinder 6, The spring 7, is confined between the lower end wall of the inner cylinder 6, and a piston 10, interposed between said spring and the upper end of the outer cylinder 8, said piston for the purpose of adjustment being mounted upon a screw-threaded stem 11, which fits a screw-threaded aperture in the upper closed end of the outer cylinder 8. For certain purposes of the invention this piston may be omitted.

The semi-elliptic spring 3, which constitutes the main-spring, is a leaf-spring having a low degree of deflection-load-ratio, and it is of such character and strength as to adapt it to sustain the load of the body of the vehicle and its contents, whether the load be normal, or greater or less than normal.

The compression-spring 7, which constitutes the auxiliary-spring, has a high degree of deflection-load-ratio and is of such character and strength as to adapt it to resiliently sustain at least a normal load, by which I mean a predetermined load less than, or equal to, but not substantially greater than the total weight of the body of the vehicle and its contents. By the term "body" I mean to include all of the spring-supported parts of the vehicle.

In this form of my invention, I limit the load-induced movement of the auxiliary-spring 7, to that due to the normal load by limiting the inward movement of the cylinder 6, within the outer cylinder 8; and I have shown the inner cylinder 6, of such length that its inner end will engage, and be arrested in its inward movement by contact with, the upper end of the outer cylinder 8, when the spring 7, has been compressed under the weight of the normal load.

The normal load having been predetermined, in adjusting the auxiliary-spring for use, the car being stationary, the piston 10, is preferably adjusted by means of its screw-threaded stem 11, to compress the auxiliary-spring 7, to such a degree as to bring into contact, or but slightly separate the inner end of the cylinder 6, from the upper end of the cylinder 8 when the auxiliary spring, 7, is under such normal load, so that any additional load on the spring-system will be ineffective to cause any substantial further compression or increase in the spring-force of the auxiliary-spring.

The operation of the device is as follows:

The spring 7, having been adjusted by means of the piston 10, and its screw-threaded stem 11, to the normal load which it is intended the auxiliary-spring should resiliently support, under less than normal load said auxiliary-spring will expand forcing the cylinder 6, partway out of the outer cylinder 8, at the same time raising the body of the vehicle relatively to the axle as shown in Fig. 2. As load is added to the body of the vehicle, the auxiliary-spring 7, becomes more and more compressed until further compression is prevented by the engagement of the inner end of the cylinder 6, with the upper end of the outer cylinder 8, at normal load.

Over-load stress whether due to an additional weight placed in the body 2, or due to a shock caused by a sudden upward movement of the axle as when the wheel of the vehicle encounters a sharp obstruction or elevation in the road-bed, will be transmitted from the body to the main-spring, 3, through the cylinders of the auxiliary spring-mechanism acting as a substantially rigid element.

Under an abnormal load or an over-load, the main-spring, 3, acts in substantially the same manner as though the auxiliary-spring were not present, and the main-spring were connected directly to the body of the vehicle.

When, however, the stress upon the spring-system becomes less than that due to a normal load, as when the wheel enters a sharp depression in the road-surface, the auxiliary-spring 7, instantly acts to supplement the action of the main-spring 3, in the tendency to separate the wheel or axle and the body of the vehicle.

While the auxiliary-spring is thus in action, the spring-system will have a materially greater deflection-load-ratio, so that for any given increase in degree of separation of the wheel or axle, and the body, over that due to a normal load the supporting power of the spring system will be materially greater than if the auxiliary-spring were not present. This diminishes both the rapidity and the distance of the fall of the body, thus diminishing the shock.

I am aware that it has been proposed to use in combination with the main-springs of road-vehicles, auxiliary or supplementary springs of various kinds ordinarily termed shock-absorbers; but I believe that in all such prior devices the auxiliary or supplementary springs were employed merely for the purpose of adding flexibility to the spring-system; and so long as the vehicle was in motion such auxiliary or supplementary springs were in ever-changing action the same as the main-springs, and the action of the main-springs was supplemented or modified by the action of such auxiliary or supplementary springs under all conditions of load.

In my invention the auxiliary-spring neither supplements nor modifies materially the action of the main-spring so long as the main-spring is under a normal load, or a load substantially greater than normal; but so long as the load remains substantially at, or in excess of normal, there is maintained in my auxiliary-spring a reserve or spring-energy substantially sufficient to support the normal load, and this reserve of spring-energy does not come into effective action until that point is reached in the movement of separation of the body and axle at which the load is reduced to substantially normal.

By means of my invention it is possible to employ an auxiliary-spring of such high deflection-load-ratio that the reactionary movement of the auxiliary-spring shall be substantially as great as, or even greater than, the upward movement of the body of the vehicle relatively to the axle under all ordinary conditions, and to thereby relieve the body from shock due to a reverse action of the springs.

While the highest degree of utility of the auxiliary spring will be obtained when said spring is of such strength as to adapt it to sustain the full load and is prevented from supporting substantially more than said full load, it will be apparent that an auxiliary spring of less strength would possess more or less utility to the extent to which it supports a part of the full load.

Referring to the construction shown in Figs. 3, 3ª, 4, 4ª, and 4ᵇ 21, is the axle and 22, is the body of the vehicle.

The main-spring which comprises a semielliptic leaf-spring of low deflection-load-ratio is fixed upon the body of the vehicle, each of its ends being connected with the axle of the vehicle by means of my improved spring-mechanism, the connection for one end only of said main-spring being shown.

The end of the main-spring 23, is connected as by a shackle 24, with a slide-rod or spindle 25, which is adapted to reciprocate vertically in slideways formed in a pair of arms 26, which project laterally from a bracket 27, fixed upon the axle.

At a point between the arms 26, a disk 28, is fixed upon the spindle 25, and the auxiliary-spring 29, in the form of a helical spring of high deflection-load-ratio, is confined between said disk 28, and the lower of the arms 26, surrounding the spindle 25.

If the spring 30 is omitted as is shown in Figs. 4ª and 4ᵇ the operation of this form of suspension is as follows: the auxiliary-spring 29, is of such character and strength that it will be compressed to solid form by the normal load, as is shown in Fig. 4ª, and substantial overload causes no increase in its spring-force beyond that caused by the normal load. Overload stress will thus be transmitted from the body 22, to the main-spring 23, through the auxiliary-spring 29, acting as a substantially solid or rigid element, so that under a normal load or an overload the main-spring 23, acts in substantially the same manner, as though the auxiliary-spring 29, were not present. When, however, the stress upon the spring-system becomes less than that due to a normal load, as when the wheel enters a sharp depression in the road-surface, the auxiliary-spring supplements the action of the main-spring 23, in the tendency to separate the wheel or axle and the body of the vehicle, as is shown in Fig. 4ᵇ.

In adapting my spring-system to certain types of vehicle it is found desirable to remove part of the main-springs with which the vehicle was originally equipped. In such case this diminution in the capacity of the main springs may be compensated for by extending the spindle 25, a substantial distance above the upper of the bracket arms 26, and confining a supplementary main-spring 30, in the form of a helical spring of low deflection-load-ratio as compared with the auxiliary-spring 29, between said upper bracket arm 26, and a disk or nut upon the upper end of said spindle.

This supplementary main-spring 30, may be omitted if desired, as is shown in Figs. 4ª and 4ᵇ. When this supplementary main-spring 30, is employed, the downward movement of the disk 28, can be limited by the compression of either the auxiliary-spring 29, or the supplementary-spring 30, to solid form, as is shown in Fig. 3, in which the respective parts are under a load greater than the normal load. In Fig. 3ª the parts are shown under normal load. In Fig. 4 the parts are under a load less than normal, the body being momentarily unsupported by the supplementary main spring 30 and being supported by the auxiliary spring 29. When the springs 29 and 30 are acting simultaneously, each carrying a portion of the load, they form together a supplementary main spring; and the spring 29, when acting independently of the spring 30, under such a subnormal load that the spring 30 has expanded to its free height, will carry the whole load and will be the auxiliary spring, acting as heretofore described.

In the form of my invention shown in Figs. 5 and 6, 31, is the axle and 32, the body, and 33, a leaf-spring mounted upon the axle, all substantially as shown in Figs. 1 and 2.

An air-cylinder 34, is mounted upon the body 32, by means of a bracket 35.

The air-cylinder 34, has a central bore adapted to receive a reciprocatory piston or plunger 36, which is connected as by a shackle 40, with the end of the leaf-spring 33.

The upper end of this central bore forms an air-chamber 37, which is surrounded by an annular auxiliary air-chamber 38, formed in an enlarged upper end-portion of the air-cylinder. Ports 39, afford communication between the air-chambers 37 and 38.

The central air-chamber 37, is of comparatively small cubic capacity, while the combination of the air-chambers 37 and 38 is of comparatively large cubic capacity.

The ports 39, are adapted to be closed by the piston 36, at a point in its movement upward relatively to the air-cylinder 34, at which the air in the central air-chamber 37, as well as the air in the auxiliary air-chamber 38, has reached a pressure capable of supporting the normal load; and further pressure of the air within the central air-chamber 37, due to overload, is prevented, by the closing of the ports 39, from being transmitted to the auxiliary air-chamber 38.

In this form of my invention the air-spring formed within the air-chamber 37, serves as a supplementary main-spring, and acts to supplement or modify the action of the main leaf-spring 33.

In this form of my invention, under a normal load or an overload, the main-spring 33 and 37, act in substantially the same manner as though the auxiliary-spring 38, were not present.

When, however, the stress upon the spring-system becomes less than that due to a normal load, as when the wheel enters a sharp depression in the road-surface, the auxiliary-spring 38, is instantly brought into action by the opening of the ports 39, and acts to supplement the action of the main-springs 33 and 37, in substantially the same manner as do the other forms of auxiliary-spring above described.

It will be observed that, when the load is less than the normal load so that the ports, 39, are open, the deflection-load-ratio of the auxiliary-spring, 38, and the deflection-load-ratio of the supplementary main-spring, 37, are identical in value, this value of the deflection-load-ratio being materially greater than the deflection-load-ratio of the supplementary main-spring, 37, when the load is greater than that which will close the ports, 39.

While in one of the forms of my invention above described, I have shown means for adjustment of the auxiliary-spring, I do not consider that accurate or close adjustment of the auxiliary-spring is necessary to obtain the substantial advantages of the invention, because the deflection-load-ratio of my auxiliary-spring is so high that for the purpose of the invention whatever change in its spring-force occurs throughout its ordinary range of action is negligible, and any change which could be made by ordinary and convenient means of adjustment would be unimportant in the action of the spring-system. For the same reason minor variations from normal load would be negligible in the operation of the spring-system.

By the deflection-load-ratio of a spring I mean the numerical value of the quotient found by dividing the numerical value of a small change in the deflection of the spring by the numerical value of the change in a load on the spring which would produce a change in the spring force corresponding to that change in deflection.

By a spring having a comparatively low deflection-load-ratio I mean a spring of such strength and flexibility as to be adapted to resiliently support substantially more than the normal load, whereby it is adapted to afford continuous resilient support for the load under usual road conditions.

By a spring having a comparatively high deflection-load-ratio I mean a spring whose flexibility is so great and which would be so responsive to changes in load conditions that it could not be used practically as the main spring of the vehicle in whose suspension system it could however be used satisfactorily as an auxiliary-spring in the manner in which the auxiliary-spring described in this specification is used and operates.

What I claim as new and desire to secure by Letters Patent is—

1. In a suspension system, a main-spring having a relatively low deflection-load-ratio; an auxiliary-spring having a relatively high deflection-load-ratio; and means constructed and arranged to so support them that the spring force of the auxiliary spring is never substantially greater than that due to the normal load.

2. In a suspension-system, a main-spring; and an auxiliary-spring in which the spring-force is never substantially greater than that due to the normal load and such that a substantial auxiliary-spring-load-relieving deflection of the load from a predetermined normal position causes only an inconsiderable decrease in the spring-force in said auxiliary-spring.

3. In a suspension-system, a main-spring having a relatively low deflection-load-ratio; and an auxiliary-spring having a relatively high deflection-load-ratio, said auxiliary-spring acting mainly when its spring-force is less than that due to the normal load.

4. Spring-mechanism for supporting the body upon the axle of a vehicle, comprising a main-spring of comparatively low deflection-load-ratio, an auxiliary-spring of comparatively high deflection-load-ratio, and means for positively preventing a substantial increase, by an overload, in the spring-force in the auxiliary-spring above that due to a predetermined normal load.

5. In a suspension-system, a main leaf-spring; and an auxiliary helical-spring of high deflection-load-ratio compared with the main leaf-spring, and means for limiting the load-induced spring-force in the auxiliary helical-spring to substantially that due to the normal load, 6. In a vehicle the combination with the body; and axle; of a leaf-spring interposed therebetween; and a coil-spring interposed between said leaf-spring and the body of the vehicle, said coil-spring having a high-deflection-load-ratio as compared with the leaf-spring, and being arranged and supported so as to act mainly when its spring-force is less than that due to the normal load.

7. Spring mechanism for supporting a body upon an axle of a vehicle, comprising a main spring and an auxiliary spring, the load supporting capacities of the springs being in such relation that the auxiliary spring is substantially inoperative except during sub-normal load conditions on the main spring due to an increase of the distance between body and axle to more than normal, the auxiliary spring under such condition serving to support the body until the distance between body and axle is normal or less than normal.

8. Spring mechanism for supporting a body upon an axle of a vehicle comprising a main spring and auxiliary spring, the load supporting capacities of the springs being in such relation that the auxiliary spring is substantially inoperative under normal or super-normal load conditions, and operative under sub-normal load conditions, the auxiliary spring being more responsive than the main spring to sub-normal load conditions.

9. In a suspension system for vehicles, spring mechanism comprising a main spring and an auxiliary spring, the auxiliary spring having a high deflection-load-ratio, and means so arranged that all the stress in that portion of the spring system of which the said auxiliary spring is a member due to a sub-normal load shall pass resiliently through the said auxiliary spring.

In testimony whereof, I have hereunto set my hand this 28th day of November, 1916.

CHARLES H. CROCKETT.